(12) United States Patent
Hoang

(10) Patent No.: US 11,169,664 B2
(45) Date of Patent: Nov. 9, 2021

(54) INTERACTIVE MAPPING FOR PASSENGERS IN COMMERCIAL PASSENGER VEHICLE

(71) Applicant: Panasonic Avionics Corporation, Lake Forest, CA (US)

(72) Inventor: Lam Hoang, Ladera Ranch, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/664,701

(22) Filed: Oct. 25, 2019

(65) Prior Publication Data

US 2021/0124466 A1    Apr. 29, 2021

(51) Int. Cl.
```
G06F 3/048      (2013.01)
G06F 3/0482     (2013.01)
G06F 16/487     (2019.01)
G06F 16/435     (2019.01)
B64D 11/00      (2006.01)
G06Q 30/06      (2012.01)
G06F 16/438     (2019.01)
```

(52) U.S. Cl.
CPC ........ *G06F 3/0482* (2013.01); *B64D 11/0015* (2013.01); *B64D 11/00152* (2014.12); *G06F 16/435* (2019.01); *G06F 16/4387* (2019.01); *G06F 16/487* (2019.01); *G06Q 30/0641* (2013.01)

(58) Field of Classification Search
CPC .... G06F 3/0482; G06F 16/435; G06F 16/487; G06F 16/4387; B64D 11/00152; B64D 11/0015; G06Q 30/0641
See application file for complete search history.

(56) References Cited

U.S. PATENT DOCUMENTS

| | | | |
|---|---|---|---|
| 8,806,543 B1 * | 8/2014 | Curtis | B64D 11/00151 725/75 |
| 9,323,434 B2 * | 4/2016 | Sizelove | A47C 7/38 |
| 9,967,595 B1 | 5/2018 | Provost et al. | |
| 10,575,029 B1 * | 2/2020 | Lai | H04N 21/2146 |
| 2005/0008340 A1 * | 1/2005 | Yamagata | H04N 21/4325 386/243 |
| 2005/0278753 A1 | 12/2005 | Brady, Jr. et al. | |
| 2009/0037526 A1 * | 2/2009 | Elliott | A63F 13/358 709/203 |

(Continued)

*Primary Examiner* — Rashawn N Tillery
(74) *Attorney, Agent, or Firm* — Perkins Coie LLP

(57) ABSTRACT

A system for providing entertainments to passengers on a commercial passenger vehicle is disclosed. The system comprises a computer storage medium configured to store personal information and travel information of passengers and a server in communication with the computer storage medium and located in the commercial passenger vehicle. The server is configured to receive, from a media playback device associated with a passenger, a request on an entertainment option; obtain, based on the request, contents corresponding to the entertainment option and related to the personal information or the travel information of the passengers; obtain map data that visualizes the contents on areas on a map based on location information associated with the contents; and send, to the media playback device, the contents to be displayed on the media playback device using the map data.

16 Claims, 19 Drawing Sheets

(56) References Cited

U.S. PATENT DOCUMENTS

| | | | |
|---|---|---|---|
| 2009/0094257 A1* | 4/2009 | Nissen | G06Q 30/0261 |
| 2011/0047580 A1* | 2/2011 | Kurita | B64D 11/0624 |
| | | | 725/77 |
| 2011/0314490 A1* | 12/2011 | Keen | H04N 7/18 |
| | | | 725/23 |
| 2012/0232791 A1* | 9/2012 | Sterkel | H04H 20/62 |
| | | | 701/454 |
| 2012/0259669 A1* | 10/2012 | Stilwell | G06Q 10/02 |
| | | | 705/5 |
| 2014/0094143 A1* | 4/2014 | Ayotte | H04W 4/80 |
| | | | 455/411 |
| 2014/0237518 A1* | 8/2014 | Liu | H04N 21/43615 |
| | | | 725/75 |
| 2014/0280928 A1* | 9/2014 | Heron | H04L 43/0876 |
| | | | 709/224 |
| 2014/0282727 A1 | 9/2014 | Keen et al. | |
| 2015/0026713 A1* | 1/2015 | Jain | H04N 21/2146 |
| | | | 725/23 |
| 2016/0304207 A1* | 10/2016 | Carles | B64D 11/06 |
| 2017/0228667 A1* | 8/2017 | Duschl | G06Q 10/025 |
| 2018/0181919 A1 | 6/2018 | Jobling et al. | |
| 2019/0212160 A1* | 7/2019 | Kennedy | G06F 16/4387 |
| 2019/0301887 A1* | 10/2019 | Kudo | G06F 16/29 |
| 2020/0264008 A1* | 8/2020 | Nallu | G01C 21/3679 |

\* cited by examiner

INTERACTIVE MAPPING FOR PASSENGERS IN COMMERCIAL PASSENGER VEHICLE

TECHNICAL FIELD

This document relates to an entertainment system in a commercial passenger vehicle and, in one example, an inflight entertain system employing an interactive map.

BACKGROUND

Commercial travel has evolved to provide various entertainment options to passengers traveling to their destinations. For example, in an airplane or a train, entertainment options are provided on monitors located on the back of seats. Such monitors can enable passengers to provide various entertainment options as they travel to their destinations. The monitors can also provide travel related information to the passengers. In-vehicle entertainment systems can be designed to provide passengers with a positive travel experience.

SUMMARY

Various implementations of the disclosed technology relate to interactive mapping for passengers located in a commercial passenger vehicle. The interactive mapping allows the passengers to more entertain themselves during time spent in a commercial passenger vehicle.

In one representative aspect, a system for providing an entertainment to passengers on a commercial passenger vehicle is disclosed. The system comprises a computer storage medium configured to store personal information and travel information of passengers and a server in communication with the computer storage medium and located in the commercial passenger vehicle. The server is configured to receive, from a media playback device associated with a passenger, a request on an entertainment option; obtain, based on the request, contents corresponding to the entertainment option and related to the personal information or the travel information of the passengers; obtain map data that visualizes the contents on areas on a map based on location information associated with the contents; and send, to the media playback device, the contents to be displayed on the media playback device using the map data.

In another representative aspect, the disclosed technology provides a system for providing an entertainment to passengers on a commercial passenger vehicle. The system comprises a computer storage medium configured to store personal information of passengers, and a server in communication with the computer storage medium and located in the commercial passenger vehicle, wherein the server is configured to display, on the media playback device, a map with clickable portions on areas that are related to the personal information or the travel information; receive, from the media playback device, a click event on a portion among the clickable portions; and display, on the media playback device, contents associated with the portion.

In another representative aspect, the disclosed technology provides a method implemented by a server on a commercial passenger vehicle. The method comprises: receiving, from a media playback device associated with a passenger located in the commercial passenger vehicle, a request for information; obtaining the information requested by the request from a computer storage medium on the passenger, and transmitting the information to the media playback for display of the information on the media playback device to display the information along an axis related to a travel path or an activity log of the passenger.

In yet another exemplary aspect, the above-described method is embodied in the form of processor-executable code and stored in a computer-readable program medium. In yet another exemplary embodiment, a device that is configured or operable to perform the above-described method is disclosed.

The above and other aspects and their implementations are described in greater detail in the drawings, the descriptions, and the claims.

DETAILED DESCRIPTION

Recent advances in digital video, computer and display technologies have made it possible to offer a large number of entertainment options to passengers traveling in a commercial vehicle. For example, international airlines often offer tens or hundreds of movies, television shows and audio programs produced across the globe to passengers. Further-more, such inflight entertainment systems also offer a flight path viewing functionality by which passengers are able to view current position of the airplane overlaid on a world map.

However, the present day technology for offering entertainment and information to passengers is not fully able to provide an immersive experience by which passengers are able to extend their travel experience to the entertainment programs available to them. For example, currently, a menu of titles shown to passengers simply lists actors, actresses and a basic story line, but fails to allow passengers to explore the titles along geographical terms, e.g., explore movies or television shows that are picturized in the country they are about to visit or are currently flying over, or in another location anywhere in the world that they can pull up by simply interacting with the world map.

The technical solutions described in the present document can be embodiment in implementations that enable such a passenger experience, among other features. Various examples of interactive mapping for passengers in commercial passenger vehicle are described. In various examples, the interactive mapping is utilized to provide entertainment options for passengers in a commercial passenger vehicle. By utilizing the interactive mapping to provide the entertainment options, it is possible to more satisfy passenger demand for entertainment services during travels. Thus, the interactive mapping can increase passenger experience during the time they stay in the vehicle. Also, by associating the entertainment options with purchases of items, e.g., products and flight tickets, using the interactive mapping, it is also possible to create more business opportunities for airline companies and other commercial vehicles to make additional profits.

Figure 1:
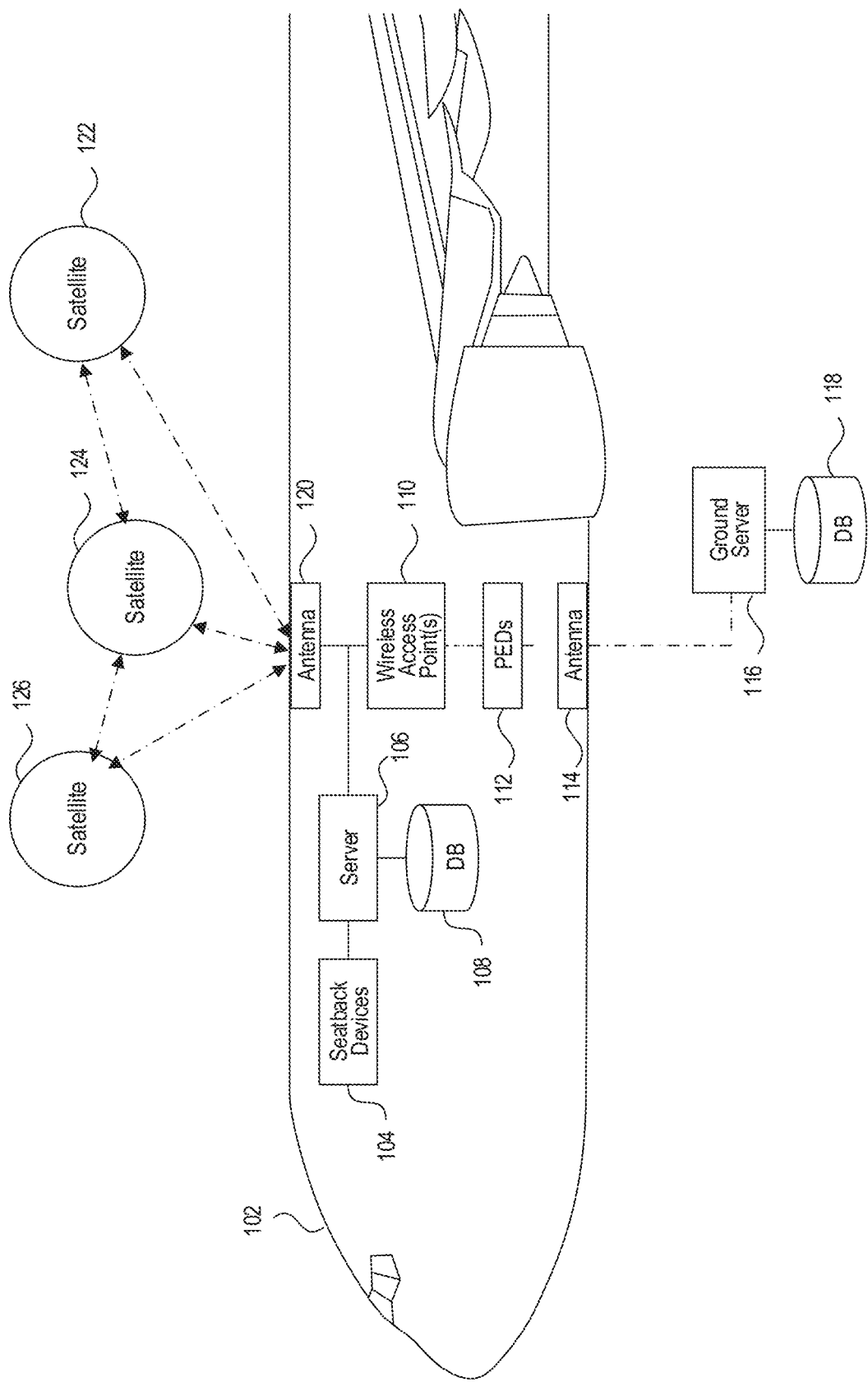
FIG. 1 shows an exemplary vehicle entertainment system installed in an airplane based on some implementations of the disclosed technology.

FIG. 1 shows an example of an inflight entertainment (IFE) system installed in an airplane 102. The IFE system includes a server 106 located in the airplane 102. The server 106 is communicably coupled to the seatback devices 104 and PEDs (Personal Electronic Devices) 112 to display the interactive mapping. The IFE system includes a communications network deployed on the airplane 102. In this example, the network is an Ethernet switch but can be based on other networking standards. The IFE system can include an Ethernet switch unit which appropriately routes Ethernet frames carrying digital content to the seatback devices 104 and PEDs 112 on the network. The Ethernet switch unit may allow various Ethernet devices on the aircraft (e.g., the server 106, the seatback devices 104, PEDs 112, etc.) to communicate with one another. In some implementations, the server 106 can be in communication with a ground server 116 through satellites 122, 124, and 126 (for example, when at high altitude, flying over a body of water, or area where there is limited signaling from the ground) via an antenna 120.

The IFE system may also include at least one wireless access point (WAP) 110 that may, in some situations, be used by passengers with wireless devices such as PEDs 112. The WAP 110 provides wireless LAN network connectivity for airborne applications. The WAP 110 is connected to the IFE system via the Ethernet switch unit and allows passenger wireless devices (e.g., PEDs 112) to connect to the on-board Web content and entertainment services, as well as off-aircraft connectivity services. The seatback devices 104 and PEDs 112 can include appropriate applications stored thereon to be provided with the inflight entertainment services. In some implementations, the PEDs 112 can be in communication with the ground server 116 or another server via WAP 110 and the antenna 114. This connection can enable the PEDs 112 to access the Internet even when the airplane 102 is flying and the PEDs 112 do not have cellular connectivity.

In FIG. 1, the server 106 may be in communication with another server, e.g., a ground server 116, located on the ground (e.g., in an airport) via an antenna 114. The ground server 116 and the server 160 can communicate to exchange data and information to assist the providing of the entertainment services to the seatback devices 104 and PEDs 112. For example, the server 106 can obtain from the ground server 116 information about passengers and utilize the passenger information to provide the entertainment services utilizing the interactive mapping. For example, when the airplane 102 is waiting at an airport to board passengers or while the passengers are boarding the airplane 102, the server 106 can obtain from the ground server 116 information about passengers that are located in or are expected to board the airplane. In some implementations, the server 106 can obtain information about passengers on-board the airplane 102, e.g., for example, by being provided from the passenger on the board, obtaining information stored in the database 108 on the airplane 102, or others. The obtained information can be stored in the database 108 and the ground server 116 can obtain this information from the ground server 116.

The database 108 of the IFE system stores entertainment contents including music contents, movie contents, information associated with duty-free items, flight information, map data of corresponding contents, and others. The flight information can include information such as travel path of the air plane including an origin city, a destination city, cities between the origin city and the destination city, flight routes run by airlines, connecting flights, gate numbers, etc. The database 108 may be configured as a hard drive or other data storage structure associated with the server 106. Data within the database 108 may be arranged as a database, such as relational database, for ease of access by the server 106. The database 108 may store the entertainment contents with meta data indicating location information associated with the contents. The location information of the contents is related to the contents, which may include at least one of countries from which the contents are produced for movie contents and duty-free related contents, filming locations for movie contents, nationality of main actors in movies for movie contents, departure and arrival cities for travel related contents, or others. When the server 106 accesses the database 108 to obtain a particular content, the meta data of the particular content is obtained as well by the server 106. In some implementations, based on the meta data, the server 106 can operate to further obtain map data corresponding to the particular content and provide the content using the map data. The components as shown in FIG. 1 as a single element, e.g., the server 106, the database 108, etc. can be configured in multiple elements. For example, the IFE system can include multiple servers and multiple databases to facilitate the providing of the entertainment options to the passengers.

Figure 2:
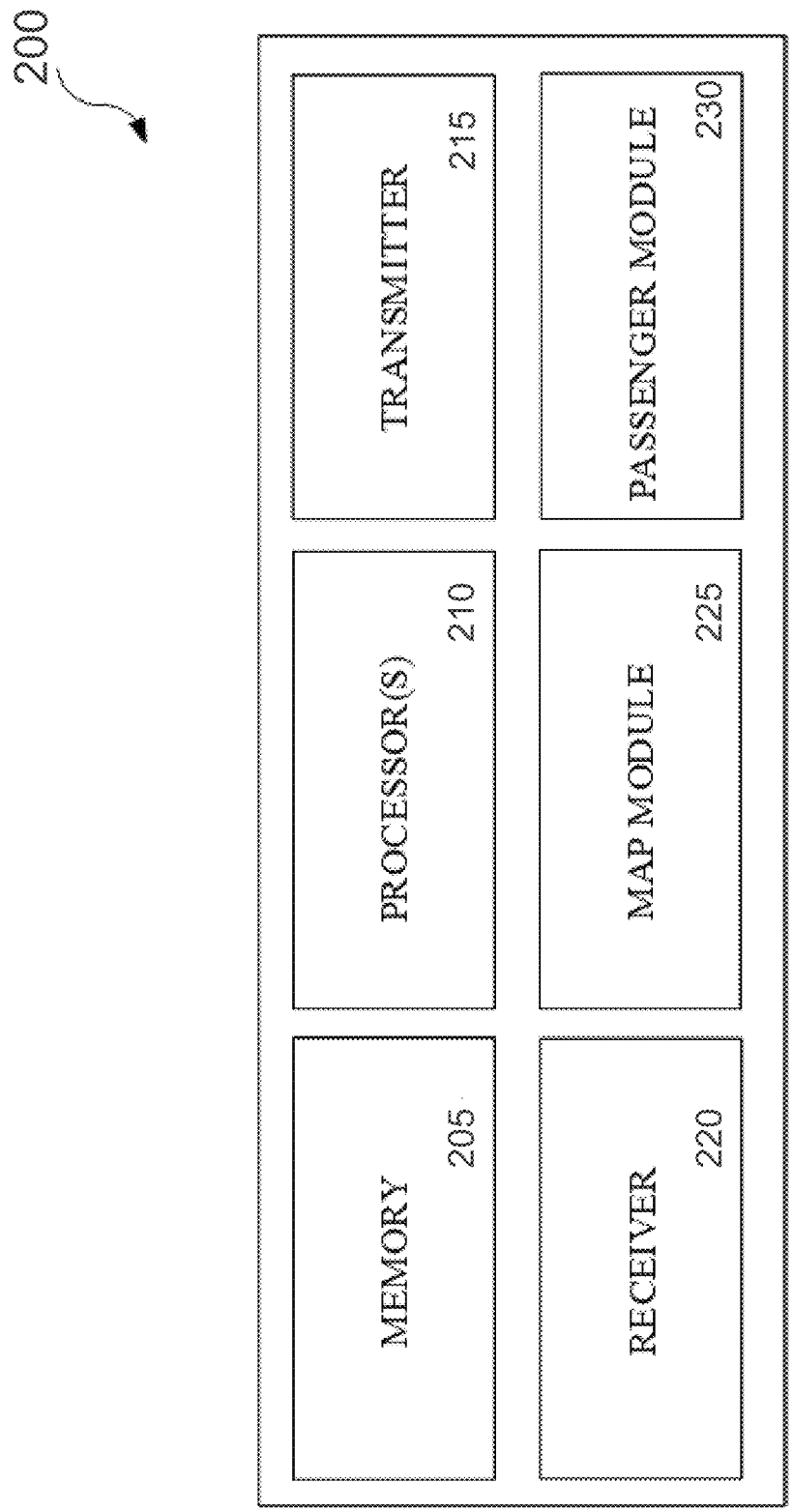
FIG. 2 shows an exemplary block diagram of a server included in an inflight entertainment system based on some implementations of the disclosed technology.

FIG. 2 shows an example block diagram of a server that is a part of an example of the IFE system. The server 200 includes at least one processor 210, a memory 205, a transmitter 215, a receiver 220, a map module 225, or a passenger module 230. The memory 205 may store instructions to be executed by the processor 210. The instructions upon execution by the processor 210 configure the server 200 to perform the operations (e.g., FIG. 10, 11, or 12) which will be described in this patent document. The transmitter 215 transmits or sends information or data to another device (e.g., another server 116, seatback devices 104, or PEDs 112). The receiver 220 receives information or data transmitted or sent by another device (e.g., another server 116, seatback devices 104, or PEDs 112).

The map module 225 of the server 200 is configured to perform operations to assist the displaying of the map data to the passengers. For example, the map module 225 can retrieve map data from the database 108, which corresponds to requests from the passengers. In some implementations, the map module 225 can retrieve map data from the database 108 regardless of the requests from the passengers. In some implementations, the map module 225 can extract the portion of the map data around the current position of the airplane for serving the map to the seatback devices 104 and PEDs 112. In some implementations, the map module 225 obtains map data from an external source outside the airplane via a communication interface. The map data can include data for a regular map and data for a globe map. In some implementations, the memory 205 stores the instruction as to whether to display map data in a regular map or the globe map and as to how to switch the display between the regular map and the globe map. In some implementations, the passengers can choose the setting for their preferred map visualization and the IFE system displays the map data based on their setting.

In various examples of the disclosed technology, the IFE system provides the entertainment services by utilizing the interactive mapping to the seatback devices 104 and PEDs 112 for passengers. There are several entertainment services available provided by the IFE system and the passenger can start the services by choosing an entertainment option that he or she wants to enjoy. For example, the selectable entertainment options (e.g., movie, music, shopping, travel information, etc.) are provided on a screen of the seatback devices 104 and PEDs 112 when the passengers on board start using the IFE system. Upon receiving the selection of an entertainment option from the seatback devices 104 and PEDs 112, the IFE system operates to provide corresponding contents to the passengers in communication with at least one of the seatback devices 104, the PEDs 112, the wireless access point 110, the database 108 or others.

Figure 3A:
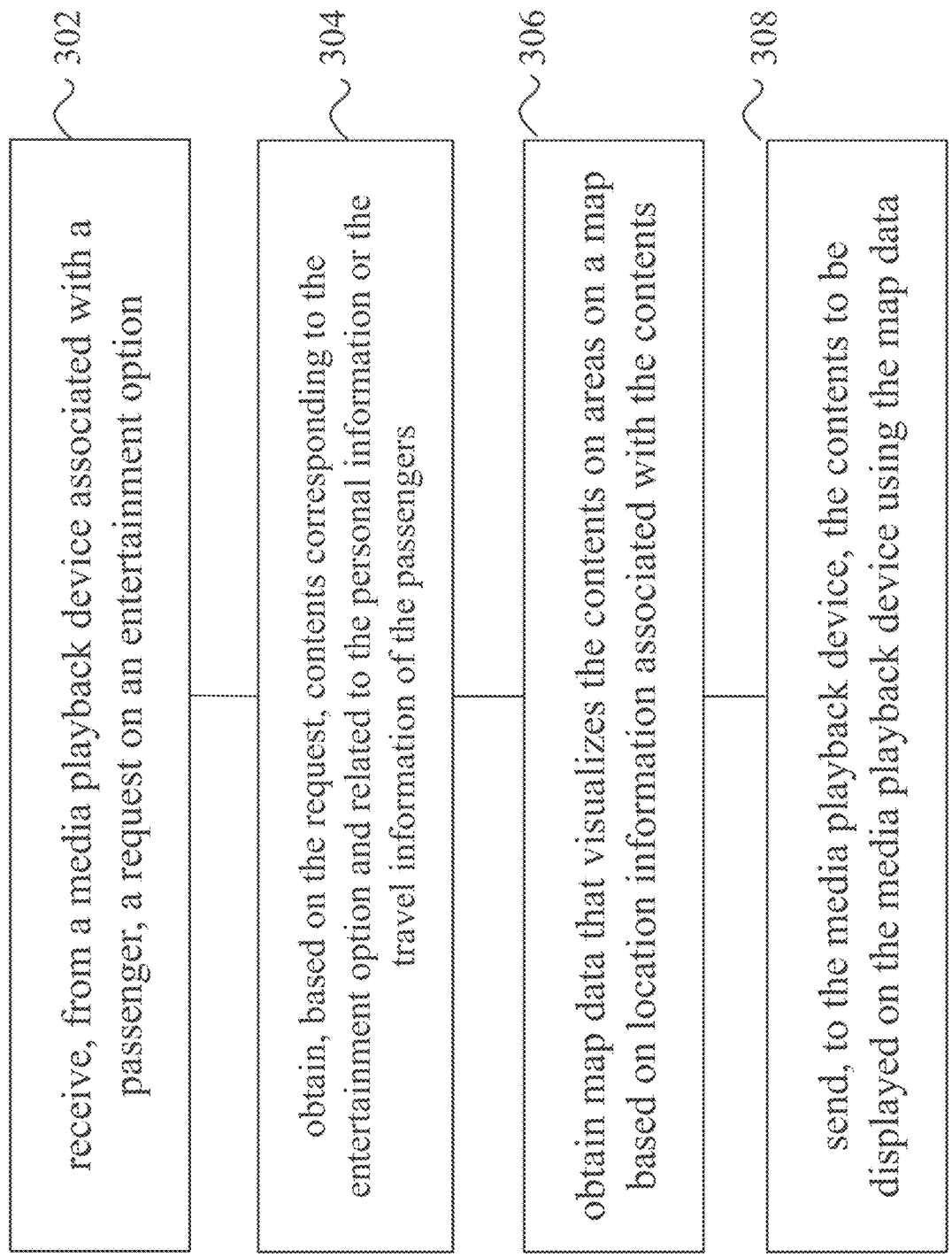
FIGS. 3A and 3B show examples of instructions executed by a server of an in-flight entertainment (IFE) system based on some implementations of the disclosed technology.

FIG. 3A shows examples of instructions executed by a server of an IFE system based on some implementations of the disclosed technology. As shown in FIG. 3A, the instructions 302 instruct the server to receive, from a media playback device associated with a passenger, a request on an entertainment option, for example, movie, music, shopping, travel information, etc. The instructions 304 further instruct the server to obtain, based on the request, contents corresponding to the entertainment option and related to the personal information or the travel information of the passengers. The instructions 306 further instruct the server to obtain map data that visualizes the contents on areas on a map based on location information associated with the contents. The instructions 308 further instruct the server to send, to the media playback device, the contents to be displayed on the media playback device using the map data.

Figure 3B:
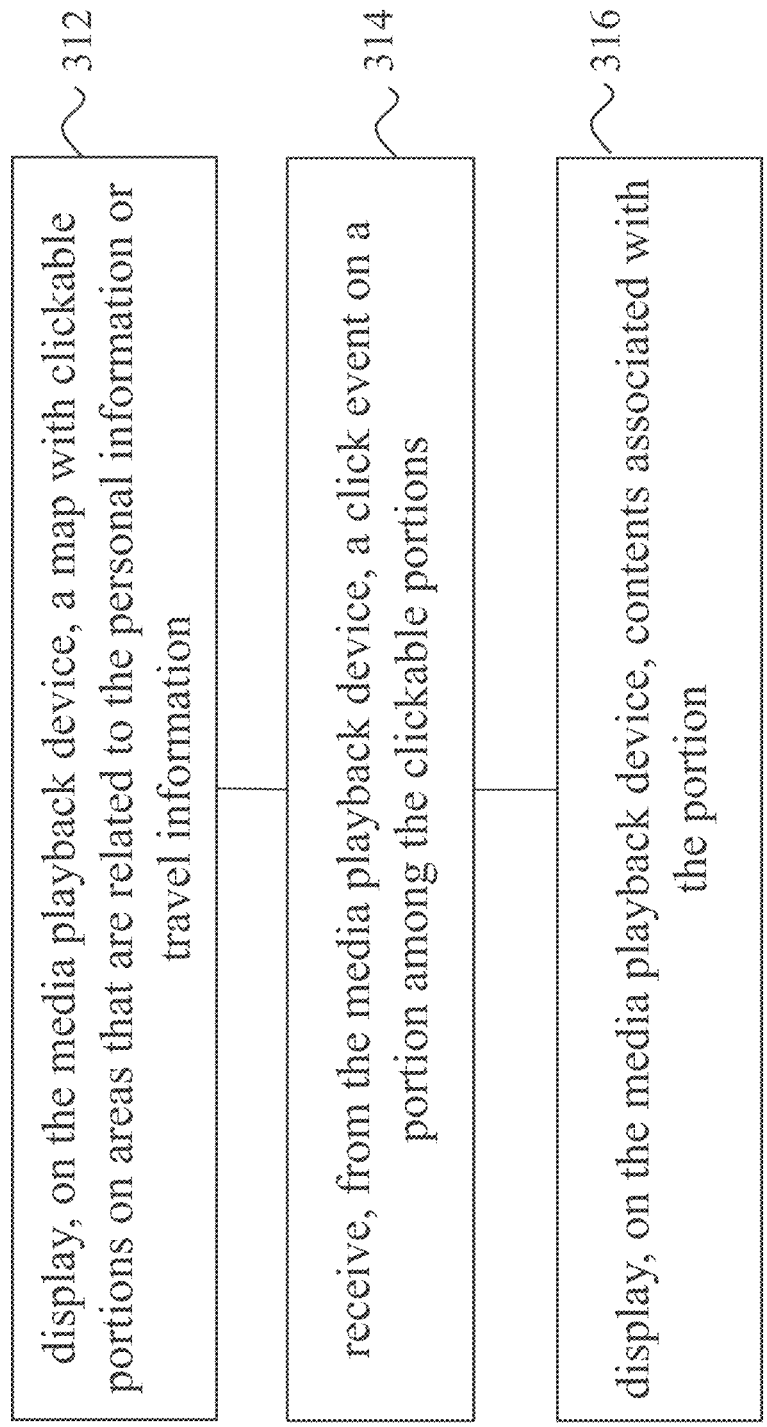

FIG. 3B show examples of instructions executed by a server of an IFE system based on some implementations of the disclosed technology. The instructions 312 instruct the server to display, on the media playback device, a map with clickable portions on areas that are related to the personal information or travel information. The instructions 314 further instruct the server to receive, from the media playback device, a click event on a portion among the clickable portions. The instructions 316 further instruct the server to display, on the media playback device, contents associated with the portion.

In providing entertainment options to the passengers, some examples of the disclosed technology are configured to provide the entertainment contents (e.g., movie, music, products, etc.) that are related to certain areas (e.g., countries or cities) on the world, when the certain areas are determined based on at least one of the passenger information, travel information, or communication with the passengers. The passenger information can include personal information about the passengers, travel histories, purpose of the trip, preferences information, or others. The travel information can include information on a present travel route any connecting flight information, or others. The entertainment contents that are provided with the relevancy to certain areas can include services of providing movies, music, products, etc. Some examples of the disclosed technology are configured to provide the information in response to a request from the passengers and display the requested information along an axis related to travel path including at least one of an origin city, destination city, or any city between the origin city and the destination city. In some implementations, the requested information can be provided to the passengers along a time line. Some examples of the disclosed technology are configured to provide the information in response to a request from the passengers and display the requested information along an activity log of the passenger. Various examples will be further discussed with reference to the drawings, for examples, FIGS. 4 to 10, which show example screens provided to the passengers.

Figure 4:
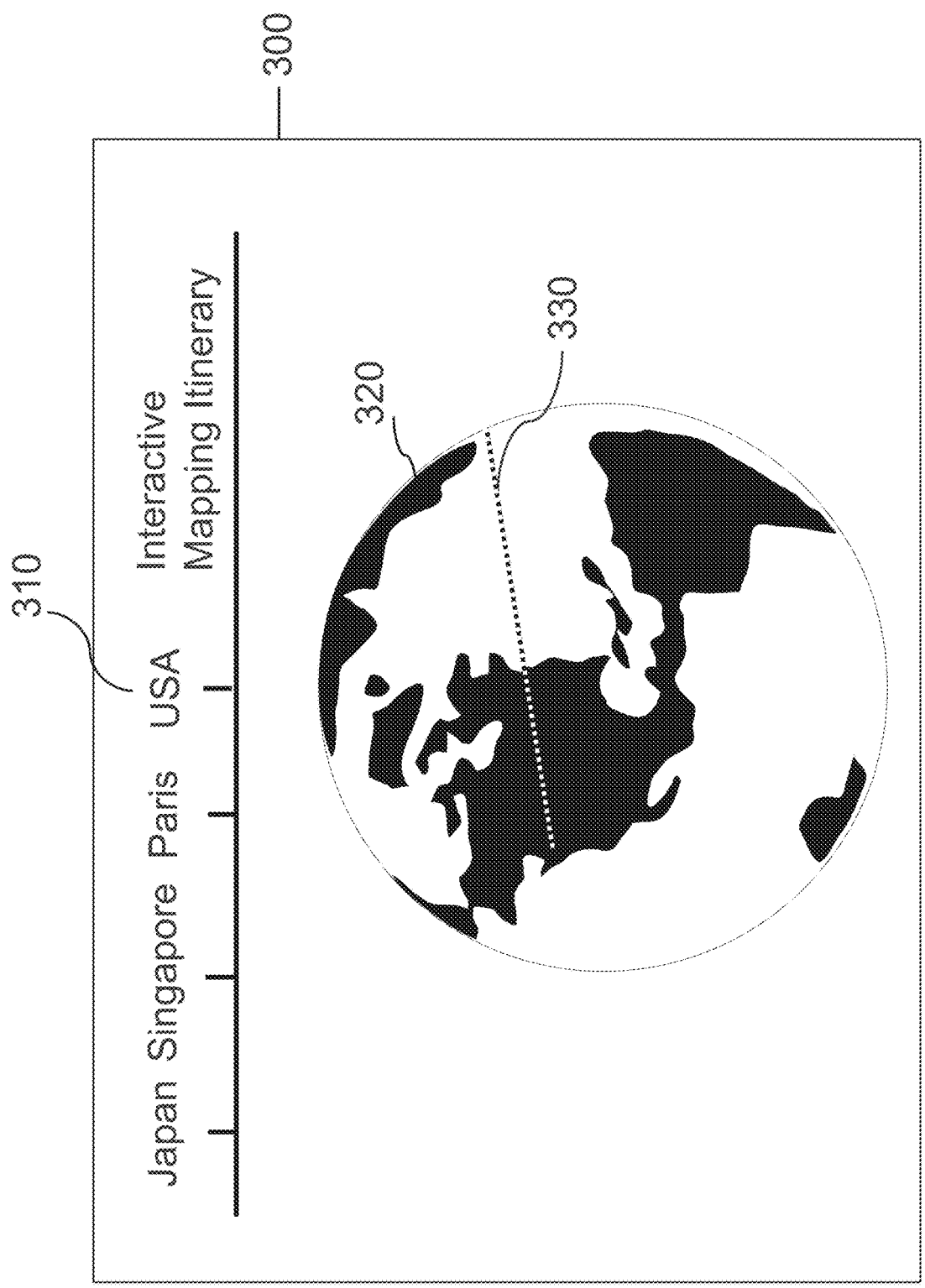
FIG. 4 shows an example of a screen illustrating an itinerary entertainment option utilizing an interactive mapping based on some implementations of the disclosed technology.

FIG. 4 shows an example of a screen illustrating an itinerary entertainment option utilizing an interactive mapping based on some implementations of the disclosed technology. The screen 300 includes a language selection part 310 and a globe 320. Although FIG. 4 shows the language selection part 310 and the globe 320 in one screen, it is also possible to provide these two items in separate screens. The globe 320 includes the visualization 330 indicating an itinerary based on flight information of an airplane, e.g., Singapore to Paris as shown in FIG. 4. In some implementations, some areas on the itinerary can be designed such that if the passenger identifies an area by selecting the area on the globe 320, more information on the identified area is provided. In some implementations, the globe 320 can be provided to the passenger as a welcome screen and areas shown on the globe can be used to identify a language for providing the inflight entertainment services to the passenger. For example, in response to the user's click on the area corresponding to the United States, the language for the entertainment services can be set as the English. The language for providing the entertainment services can be selected other ways than clicking an area on the globe 320. Once a passenger chooses a country by clicking one of the flags, the IFE system will provide the entertainment services using the official language of the selected country. The database of the IFE system can store information on the official languages of the countries and the IFE system can provide the entertainment services using the corresponding languages based on the selection of the country. In the example of FIG. 4, the language selection part 310 shows country names, e. g., Japan, Singapore, Paris, USA, that are to be used as a selectable item for a language. In some implementations, instead of the country names, the flags of countries can be provided for the language selection part 310. In some implementations, the language selection part 310 can be designed to be combined with itinerary information. For example, the first country and the last country listed in the language selection part 310 can correspond to the origin and destination of the flight. In some implementations, to provide the itinerary entertainment option as shown in FIG. 4, the IFE system obtains the flight information of the airplane and retrieves corresponding map data from the map module 225. The flight information of the airplane can be obtained from a related database or the flight attendant can directly provide the flight information to the IFE system. The memory 205 stores instructions, for example, how to display the map data and how to visualize the itinerary on the map and the IFE system provides screens to the passengers based on the stored instructions.

FIGS. 5A to 5D show examples of screens to provide a movie entertainment option utilizing an interactive mapping based on some implementations of the disclosed technology.

Figure 5A:
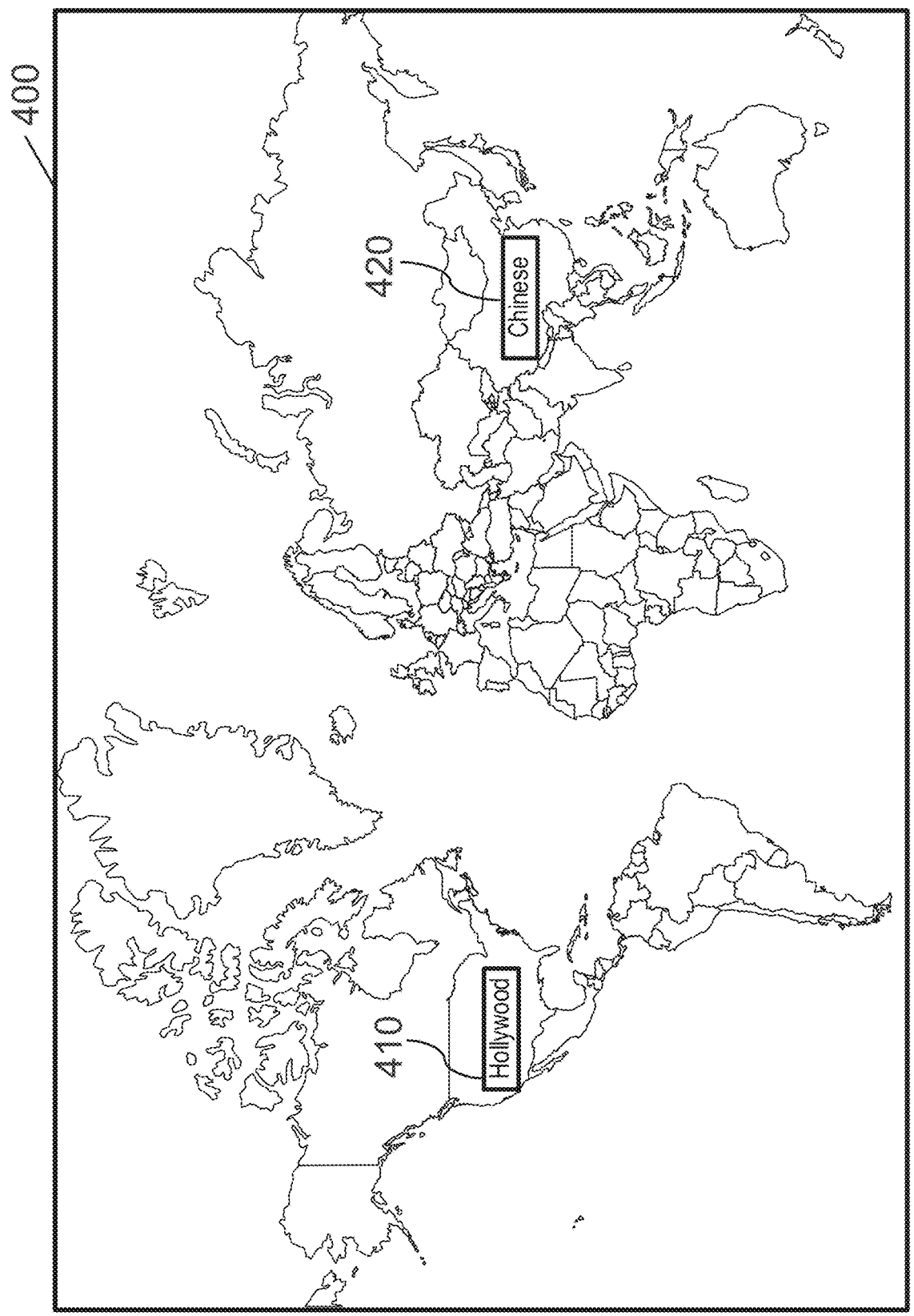
FIGS. 5A to 5D show examples of screens illustrating a movie entertainment option utilizing an interactive mapping based on some implementations of the disclosed technology.

In some implementations, the movie selection process can proceed based on the communication with the seatback devices 104 or PEDs 112 to select an area related to the movie contents provided to the seatback devices 104 or PEDs. The screen 400 can be provided to passenger who selects a movie entertainment option as his or her entertainment choice. In the screen 400, the map is provided with identifiable portions with captions 'Hollywood' 410 and 'Chinese' 420. In some implementations, the identifiable portions on the map can be determined based on the travel information of the passengers. In this example of FIG. 5A, the identifiable portions of 'Hollywood' 410 and 'Chinese' 420 correspond to the origin city and the destination city of the travel path of the airplane. Although FIG. 5A shows the two captions only, embodiments of the disclosed technology are not limited thereto. In some implementations, the map included in the screen provided to the passenger can include the identifiable portions that correspond to cities over which the airplane passes during the travel from the origin city to the destination city. In some other examples, the identifiable portions on the map can be determined based on the personal information of the passengers which includes at least one of the nationalities of passengers, addresses of passengers, or preference settings for the preferred contents. Such personal information can be already stored in the database of the IFE system and thus the server can access to the database and obtain such information.

Figure 5B:
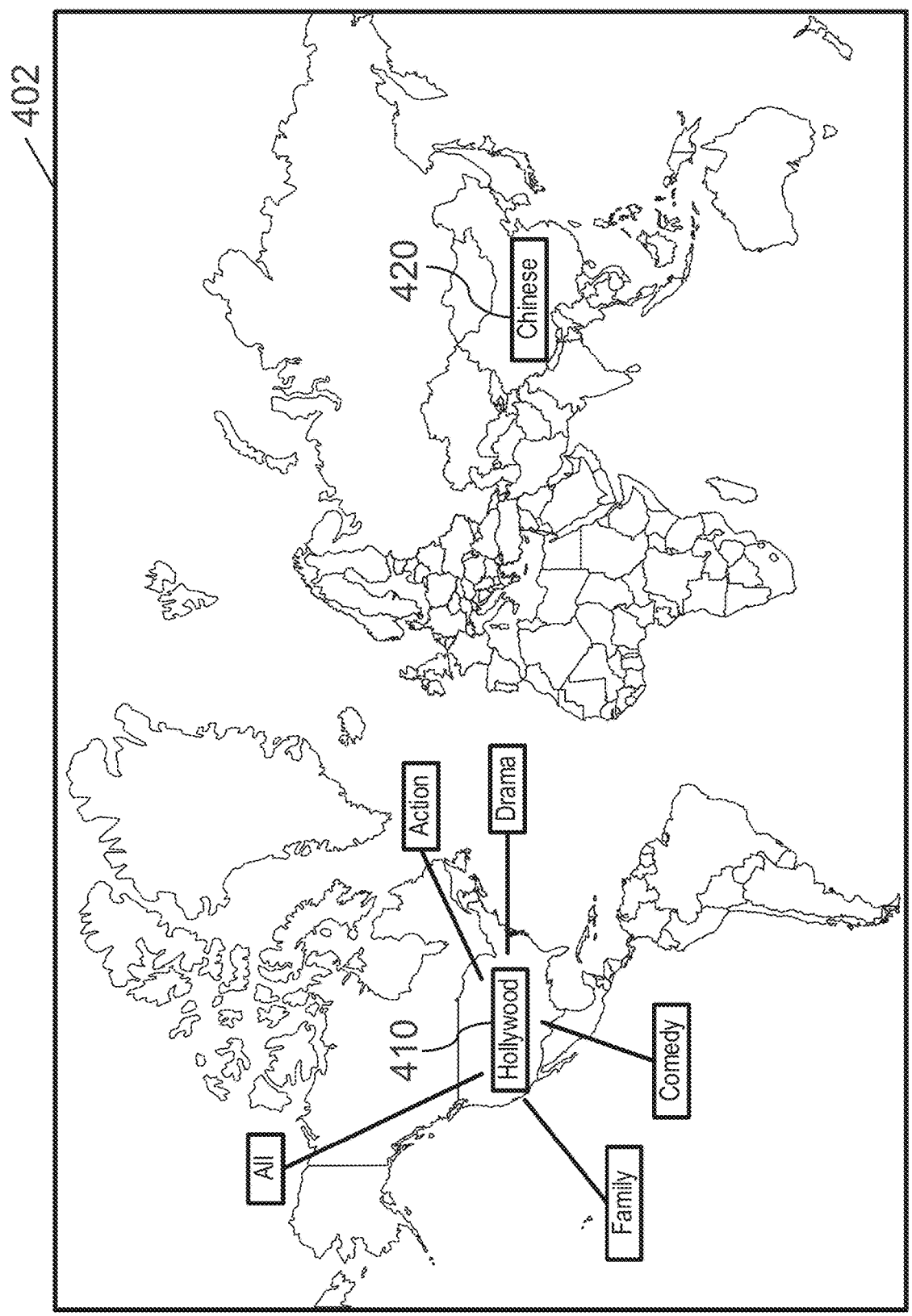
Figure 5C:
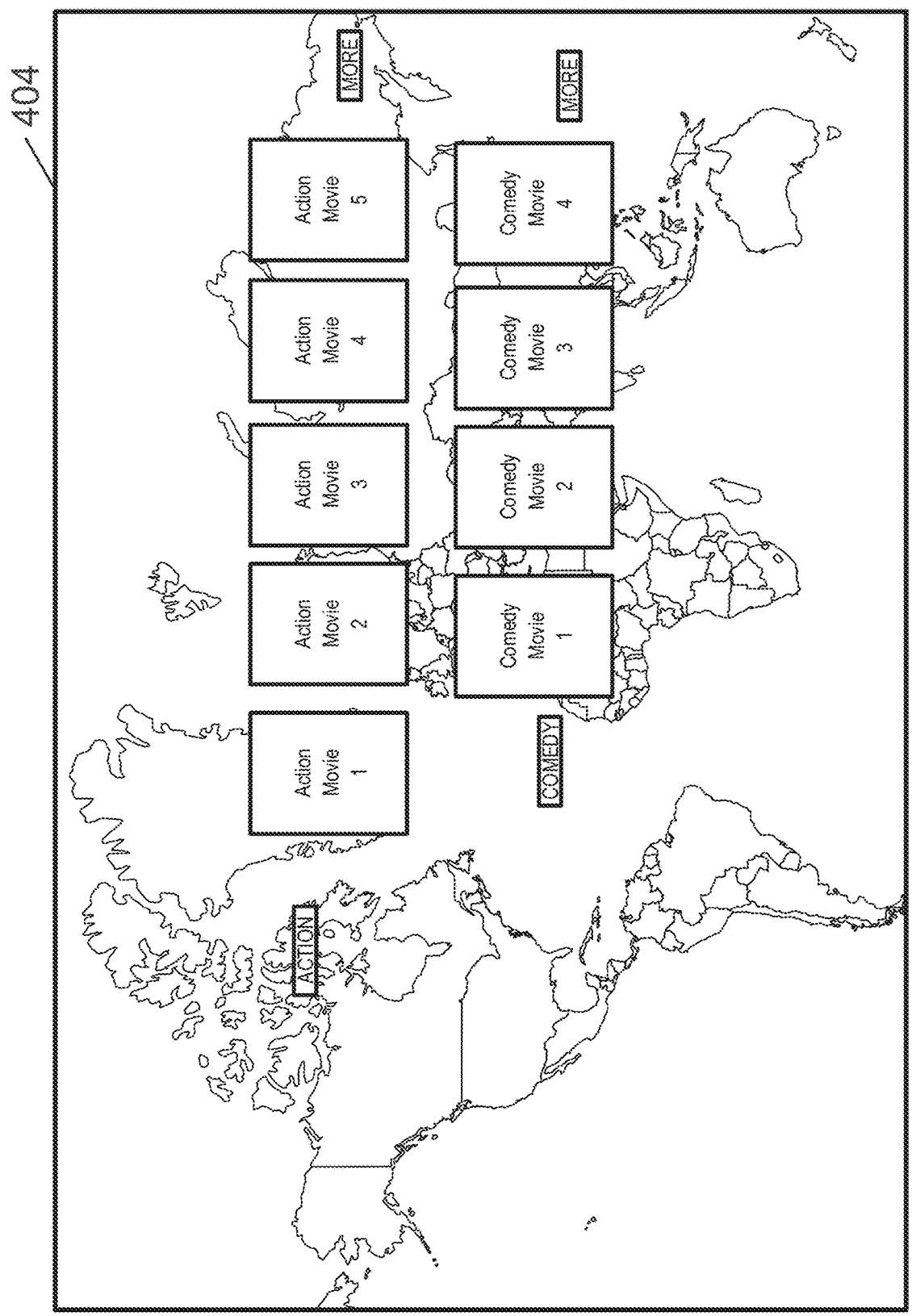
Figure 5D:
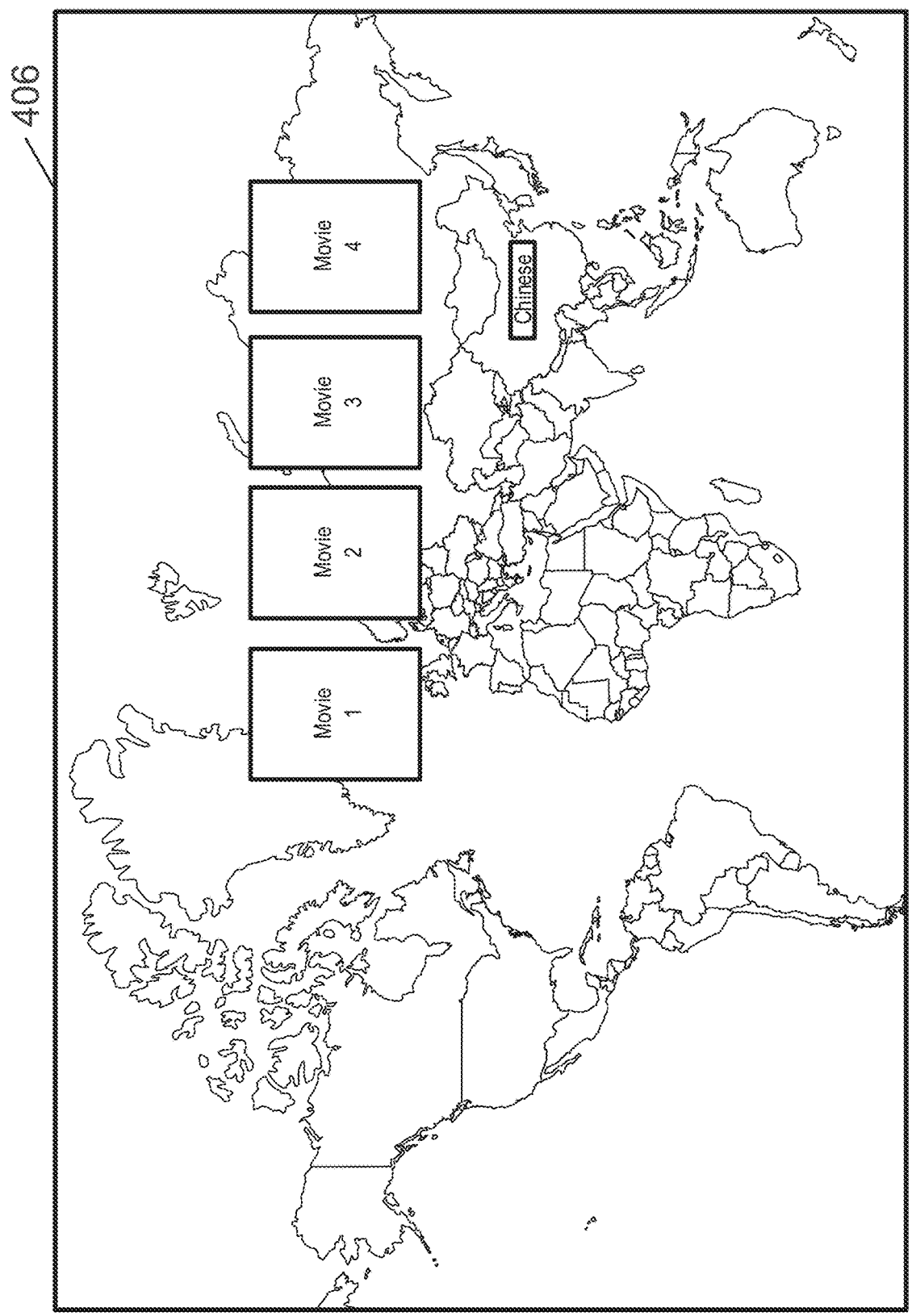

In the example of FIG. 5A, once the passenger who is provided with the screen of FIG. 5A selects the area with the caption 'Hollywood' 410 on the map in the screen 420, the IFE system provides the screen 402 as shown in FIG. 5B, which includes several genre options, e.g., 'Action,' 'Drama,' 'Family', 'Comedy,' and 'All,' to facilitate the selection of the movie. The example as shown in FIG. 5B provides the screen in which the candidate movie contents are provided based on genres, but it is also possible that other categories than genres, for example, whether it is the recent release or not, are used as the category to classify the movie contents for assisting the movie selection process. FIG. 5C shows another example of the screen 404 provided to the passenger in response to the selection of the area with the caption 'Hollywood,' to assist the movie selection for the passenger. In the example of FIG. 5C, the genre options of the movies are provided with movie posters to further assist the selection of the movie. FIG. 5D shows an example of the screen 406 provided to the passenger in response to the selection of the area with the caption 'Chinese.' In the examples of screens 402, 404 and 406, the movie contents that are provided to the passengers have at least some relevancy to the area selected by the passenger. The relevancy of the movie contents with the selected area can be determined based on at least one of the countries, filming locations, the nationality of the main actors in movies, or background information of the movies, or others. For example, a country of a movie is related to a location of a production company producing the movie. The background information of the movies can include a certain history related to the movie or certain scenes included in the movie.

In some implementations, the IFE system is configured to provide the passengers with the candidate movie contents that are related to travel information of the passengers, e.g., an origin city, a destination city, or any other city between the origin city and the destination city. For example, when the passenger travels from 'Los Angeles' to 'China,' the IFE system can be configured to provide the candidate movie contents based on the origin city of the travel path of the passenger. Thus, for the passenger who travels from 'Los Angeles' and chooses the movie entertainment option, the IFE system can provide the candidate movie contents that are associated with 'Hollywood' based on the location proximity between 'Los Angeles' and 'Hollywood.' In this case, the passenger does not need to select the area for the movie contents since the IFE system selects the area based on the origin city of the travel. In some implementations, the IFE system can be configured to provide the candidate move contents based on the destination city or any other city between the origin city and the destination city.

In some implementations, the IFE system can be configured to provide the candidate movie contents based on the current location of the airplane. The IFE system will receive signals such as Global Positioning System (GPS) signals, from outside the aircraft that are useful for determining the position of the airplane. The signals received can be converted into the position data of the airplane and the IFE system can select the area based on the converted position data of the airplane. For example, the IFE system can utilize the metadata of the movie contents, which indicates the location related information of the movie contents and are stored in the database, to provide the corresponding movie contents to the position data of the airplane. In some implementations, the correspondence between the location information in the metadata and the position data of the airplane can be determined using the software stored in the IFE system.

To provide a movie entertainment option as shown in FIGS. 5A to 5D, the database 108 of the IFE system can store movie contents with meta data indicating, for example, at least one of location-related information, genres, filming locations, main actors in movies, whether it is recent release, or other attributes such as names of directors. In some implementations, the location-related information includes origins of the movies, filming locations, or any other location-related information. In some implementations, the software stored in the memory 205 instructs the server 200 to access the database 108 to obtain information about the movies including the meta data in addition to the movie contents. The information about the movie including the meta data can be utilized to display the screens for the movie selection on a map by, for example, assisting to obtain the map data corresponding to the movie contents. The instructions stored in the IFE system includes information on how to display the map, things considered to determine the relevancy between the movie contents and the identified area, the category used to proceed the movie selection, and others, and the IFE system provides the screens for the movie selections based on the stored instructions.

For the case that the movie entertainment option is provided by utilizing passenger information stored in the database 108, the passenger module 225 of the server 200 is configured to obtain information on passengers including names, prior travel histories, current travel information, any preselected movie list, preselected point of interests, interests, hobbies, etc. The passenger information can be obtained in multiple manners and is stored in the passenger module 225. The passenger information can be obtained by the airlines and/or by a third-party prior to boarding of a corresponding passenger. In some implementations, if the passenger information was previously obtained and is stored in the relevant database, the server 200 can collect the passenger information from the relevant database. In some embodiments, for each flight, the ground server 116 may obtain names of the passengers that are expected to board the airplane 102 and other information associated with the passengers. The passenger module of the ground server 116 can store information associated with the names of the passengers that are expected to board the airplane 102.

In some implementations, for each flight, the ground server 116 may obtain names of the passengers that are expected to board the airplane 102 and one or more additional personal information about the passengers (e.g., birthdate, country of birth, career interest, etc.) to be included in the list of passenger preferences. The additional personal information can be transmitted from the ground server 116 to the server 106 and the additional personal information can be utilized to provide the movie entertainment option to the passenger. In some embodiments, the ground server 116 can provide the country of birth for the passenger to the server 106 and the birthplace information can be utilized to provide candidate movies for the passengers. For example, if passenger information for a particular passenger indicates that the passenger's birthplace is France, the server of the IFE system is configured to provide the movie list including French movies. In some implementations, the passenger information can be obtained from the passengers after the passenger boards on the airplane 102. The passenger module 225 can send to the server 106 the seat numbers of the passengers and the obtained passenger information so that the server 106 can send commands or messages to the appropriate seatback devices 104 or PEDs 112 to provide movies tailored to the passengers. In some implementations, the passenger information can be shared by an association of several airplane companies and thus can be retrieved from an external database.

In some implementations, the IFE system can be further configured to provide a message during the play of the selected movie, the message including location information related to the movie. The location information is related to the movie when the corresponding location appears in a particular scene of the movie, when the corresponding location is mentioned during the movie, when the corresponding location is from where some actors or staffs are, etc. The IFE system stores the software designed to extract the corresponding location information related to the movie and the location information is provided in the message during the play of the movie. Thus, when displaying the movie contents, the IFE system is configured to provide the message indicating the related location information with the explanation how the location is related to the movie. In response to the passenger's click on the location information in the message, the IFE system can provide, to the passenger, additional information, e.g., travel information to get to the location in the movie. Thus, it is possible for a passenger who watches the movie and wants to visit the place appearing in the movie to provide related information without further searches. This can increase the passenger experience and it can provide an opportunity for airlines to generate more revenues.

Figure 5E:
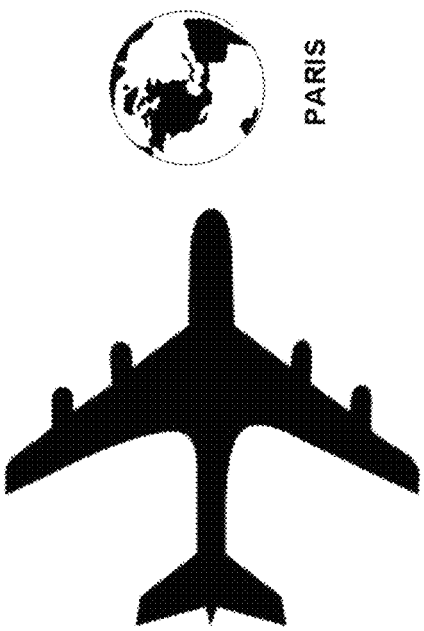
FIG. 5E shows an example of a screen illustrating a playlist for a movie entertainment option utilizing an interactive mapping based on some implementations of the disclosed technology.
Figure 5E:
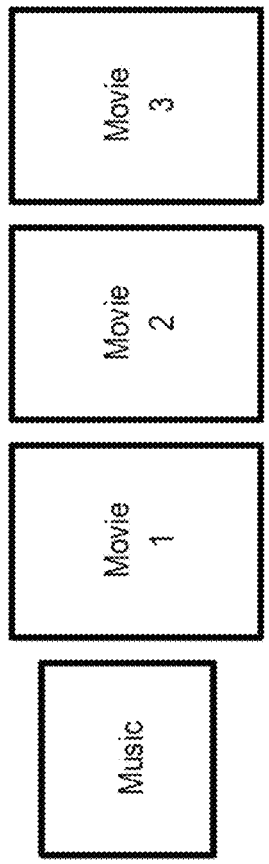
Figure 5E:

FIG. 5E shows an example of a playlist for a movie entertainment option by utilizing an interactive mapping based on some implementations of the disclosed technology. The interactive mapping feature is provided to indicate the departure information, i.e., Singapore, and the destination information, i.e., Paris. Although FIG. 5E shows the two separate globes for the departure and the destination, the departure and the destination can be shown on one globe as shown in FIG. 4. In some implementations, the departure and the destination can be shown on the rectangular map instead of the globe map. The playlist entertainment option provides the passenger playlist which is obtained by accessing the passenger information in various manners. In some implementations, the passenger can preselect the movies and configure his or her preferred playlist even before he or she is on board. For example, even before being on board, the personal devices of the passengers can access the information on the entertainment options available for his or her flight and preselect the entertainment contents for his or her flight. Then, once seated, their personal devices are paired to the IFE system and thus the playlist that he or she preselected can be displayed on the seatback devices 104 and PEDs 112. In the example of FIG. 5A, the passenger's playlist shows 'Music,' 'Movie 1,' 'Movie 2,' and 'Movie 3' for his preselection for the inflight entertainment.

Figure 6A:
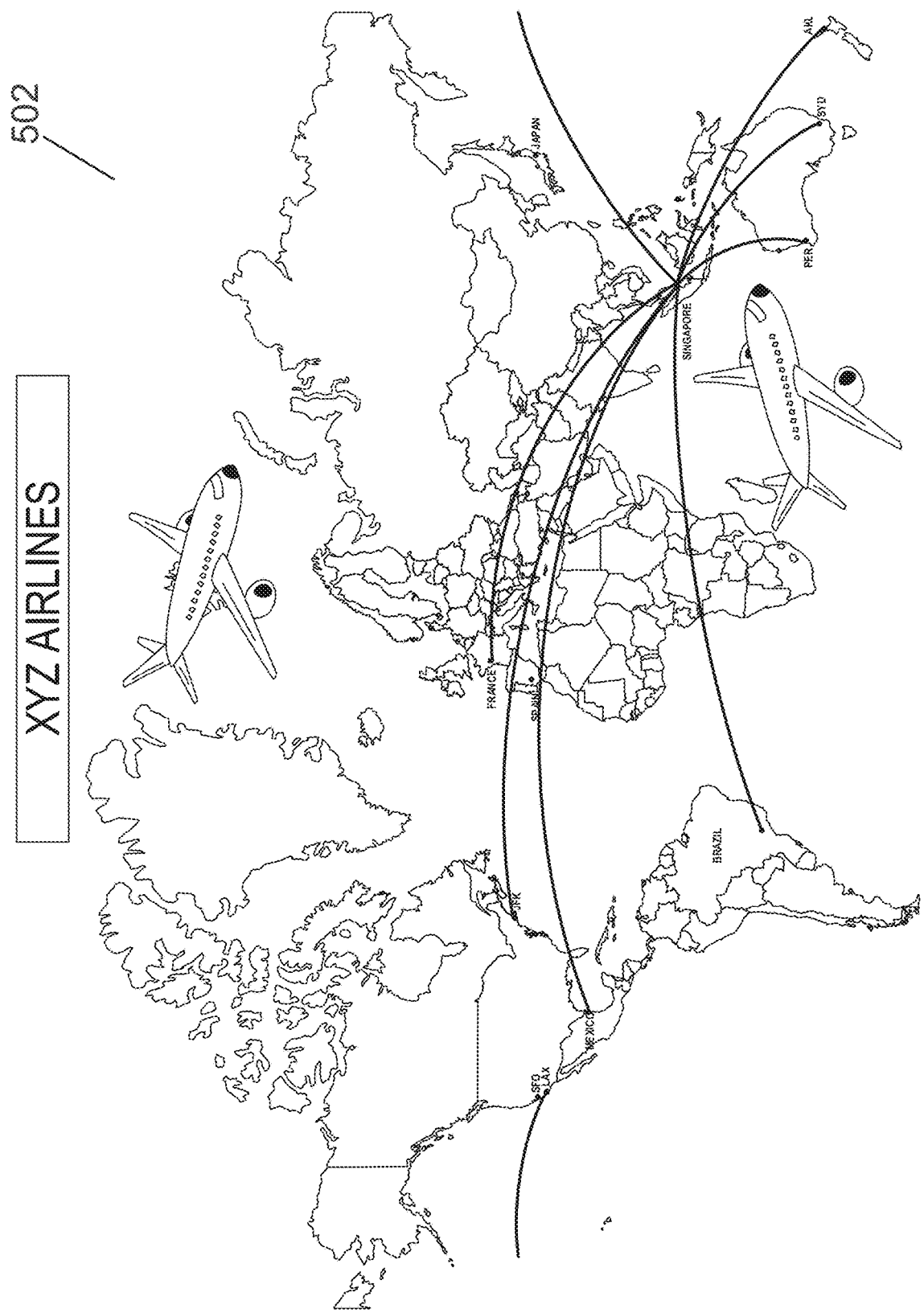
FIG. 6A to 6C show examples of screens illustrating a travel entertainment option by utilizing an interactive mapping based on some implementations of the disclosed technology.
Figure 6B:
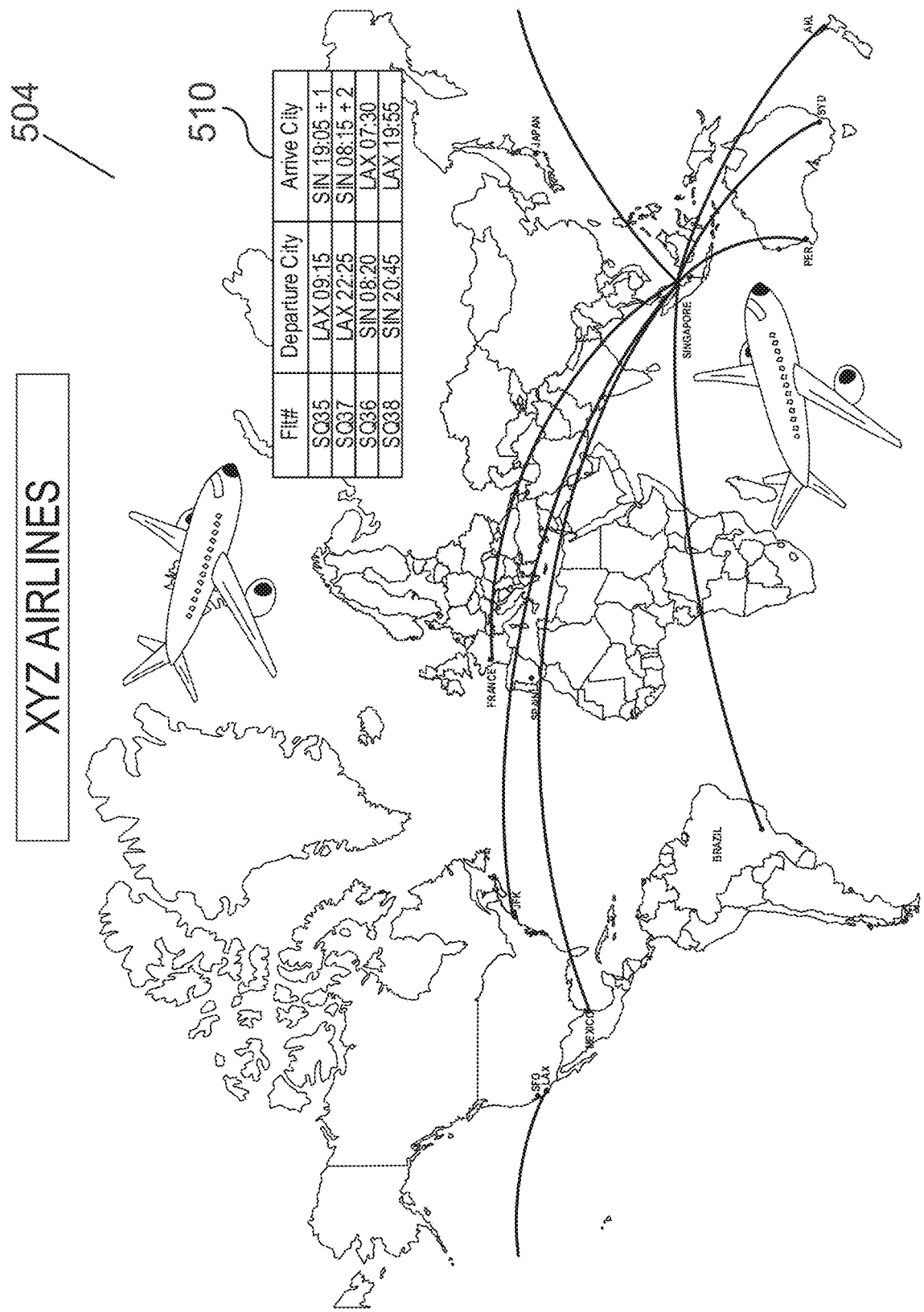
Figure 6C:
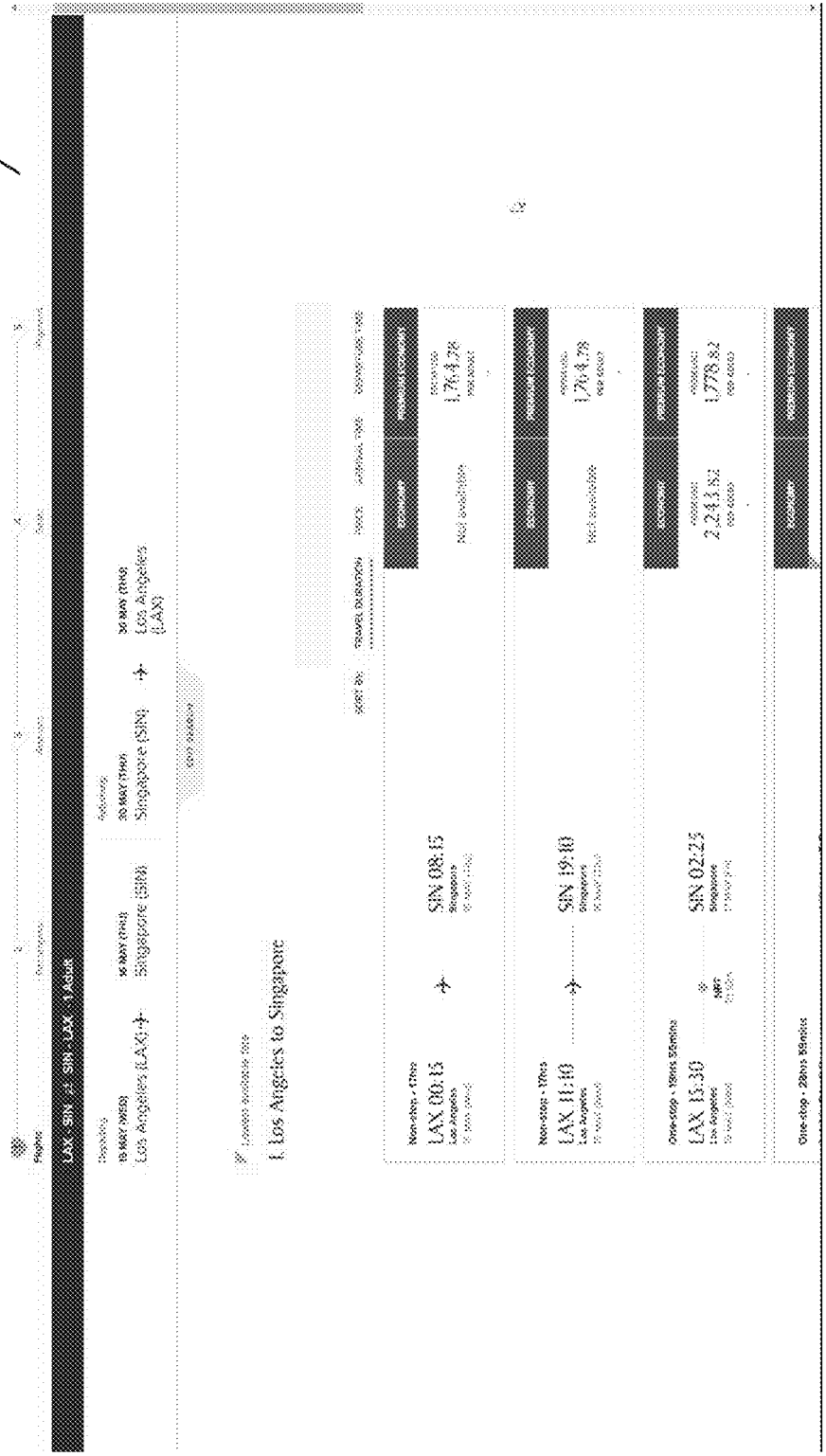

FIGS. 6A to 6C show examples of screens illustrating a travel entertainment option by utilizing an interactive mapping based on some implementations of the disclosed technology. In response to the selection of the travel entertainment option, the IFE system is configured to provide the flight route contents. As discussed with regard to the movie entertainment option, the IFE system provides travel route contents for the display on the screen provided to the passengers, wherein the travel route contents are related to certain areas on the world. In some implementations, the certain areas can be determined based on at least one of the passenger information, travel information, or communication with the passengers. For example, the IFE system can provide the travel route contents based on travel information, for example, an origin city, a destination city, or any cities between the origin city and the destination city.

FIG. 6A shows the example screen 502 with the map showing flight route contents provided by an airline, e.g., XYZ airlines, and the flight route contents are related to Singapore that is the origin city of the present flight such that the routes as shown in FIG. 6A are from, to, or via Singapore. Although the example screen 502 shows the case that the flight route contents are related to the origin city, other implementations are also possible. Thus, the flight route contents can be provided based on the destination city and other cities. In some implementations, the flight route contents can be provided based on the current location of the airplane. In some implementations, the IFE system can provide the travel route contents based on the communication with the passengers. In this case, the passenger can directly enter the desired area for the flight information and the server can provide the map with the available flight routes for the entered information. In some implementations, the flight route contents can be determined based on the personal information of the passengers which includes at least one of the nationalities of passengers, addresses of passengers, or preference settings for the preferred contents. Once the screen showing corresponding flight route contents is provided with the passengers, the passenger can select a target route that he or she is interested. FIG. 6B shows an example of the screen 504 that is provided when the passenger selects the interested route among available routes on the map. Among the flight numbers included in the screen 504 as shown in FIG. 6B, the passenger can select the flight number with which the passenger is interested the most. In response to the selection on the flight number, the IFE system can further provide the screen 506 as shown in FIG. 6C to allow the passenger to book their future flight during the present flight. Thus, this example of the destination guide entertainment option can provide more revenues for the airline.

Figure 7:
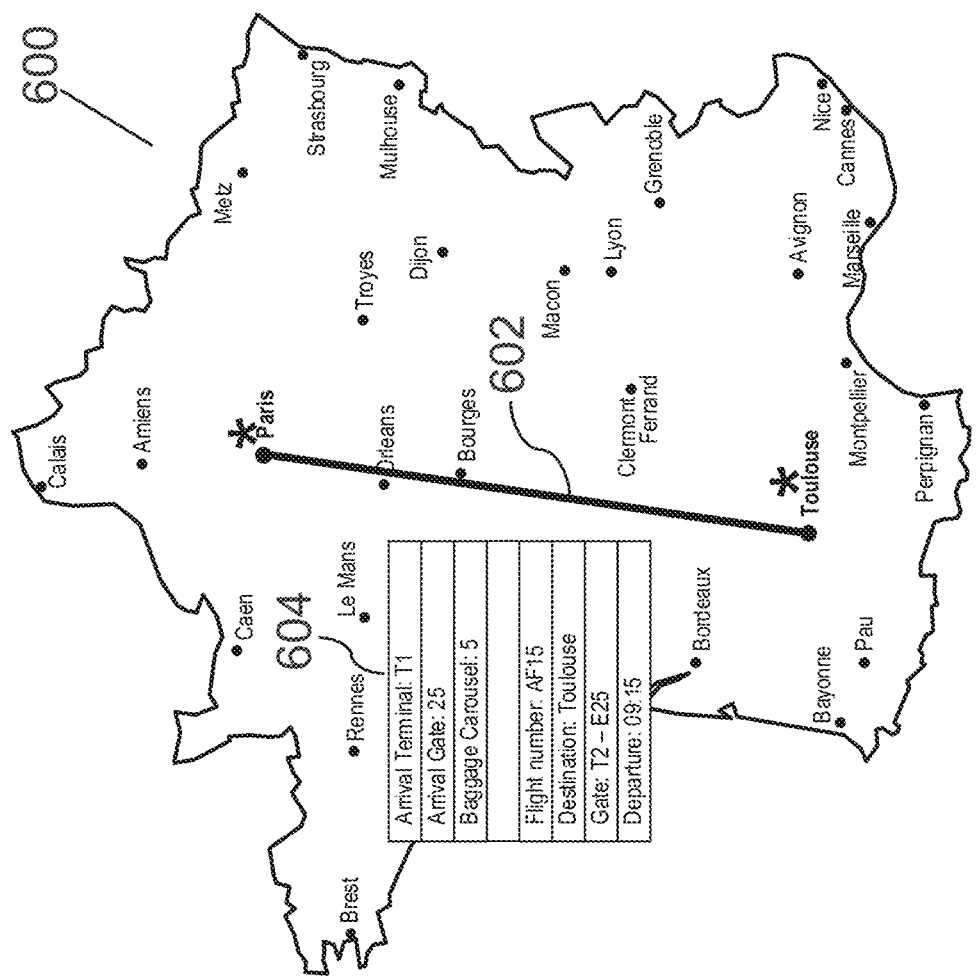
FIG. 7 shows another example of a screen illustrating a travel entertainment option including connecting gate information by utilizing an interactive mapping based on some implementations of the disclosed technology.

FIG. 7 shows another example of a screen illustrating a travel entertainment option based on some implementations of the disclosed technology. The example screen 600 as shown in FIG. 7 is configured to provide the map with connecting gate information by utilizing an interactive mapping. The screen 600 shows the map showing the flight path 602 from the origin city 'Paris' to the destination city 'Toulouse' and connecting gate information 604. The connecting gate information includes at least one of, for example, arrival terminal, arrival gate, baggage claim location, flight number, destination, departure time, etc. The connecting gate information can be provided based on travel information of the passengers or the communication with the passengers.

Figure 8A:
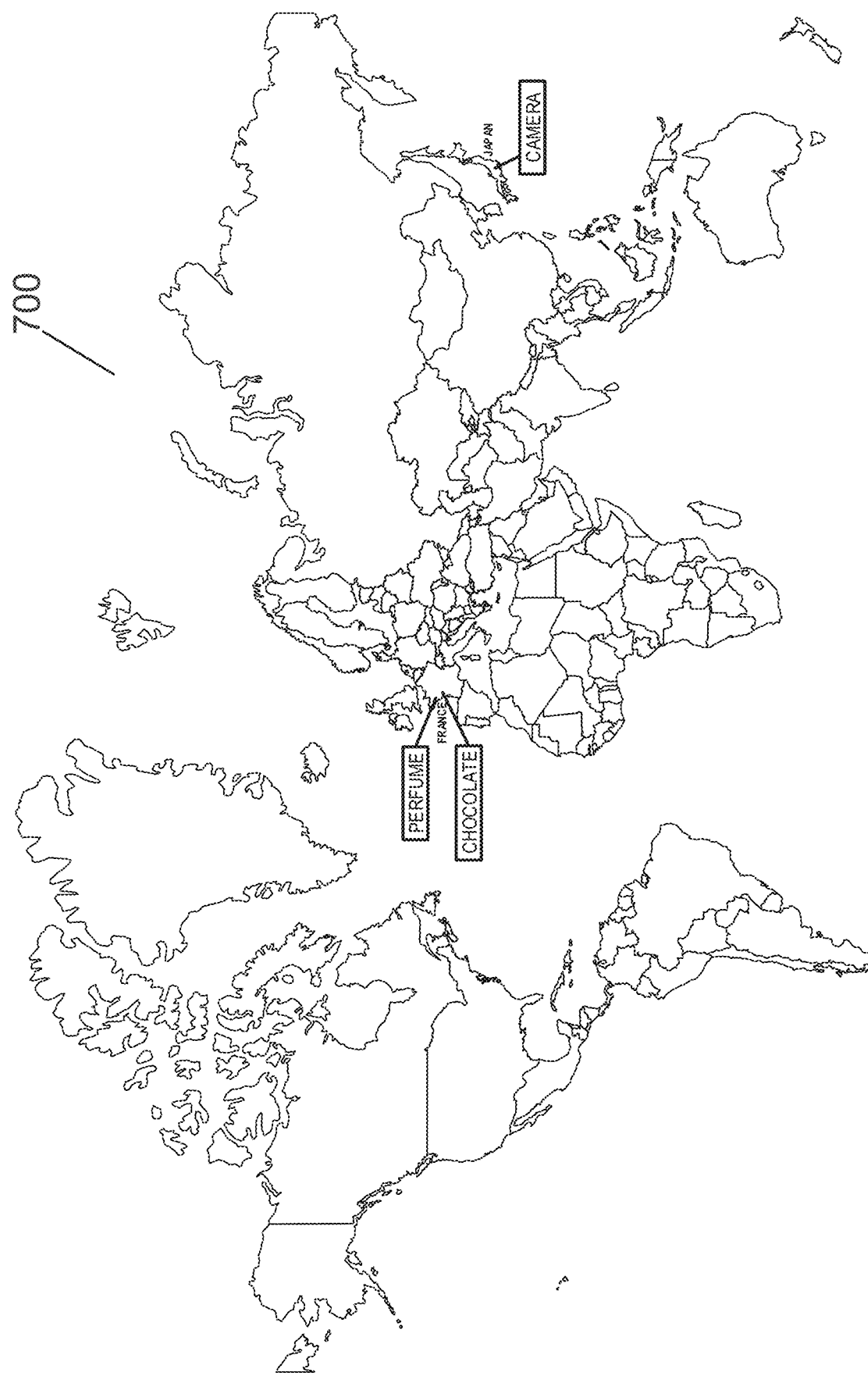
FIGS. 8A and 8B show examples of screens illustrating a market entertainment option including connecting gate information by utilizing an interactive mapping based on some implementations of the disclosed technology.
Figure 8B:
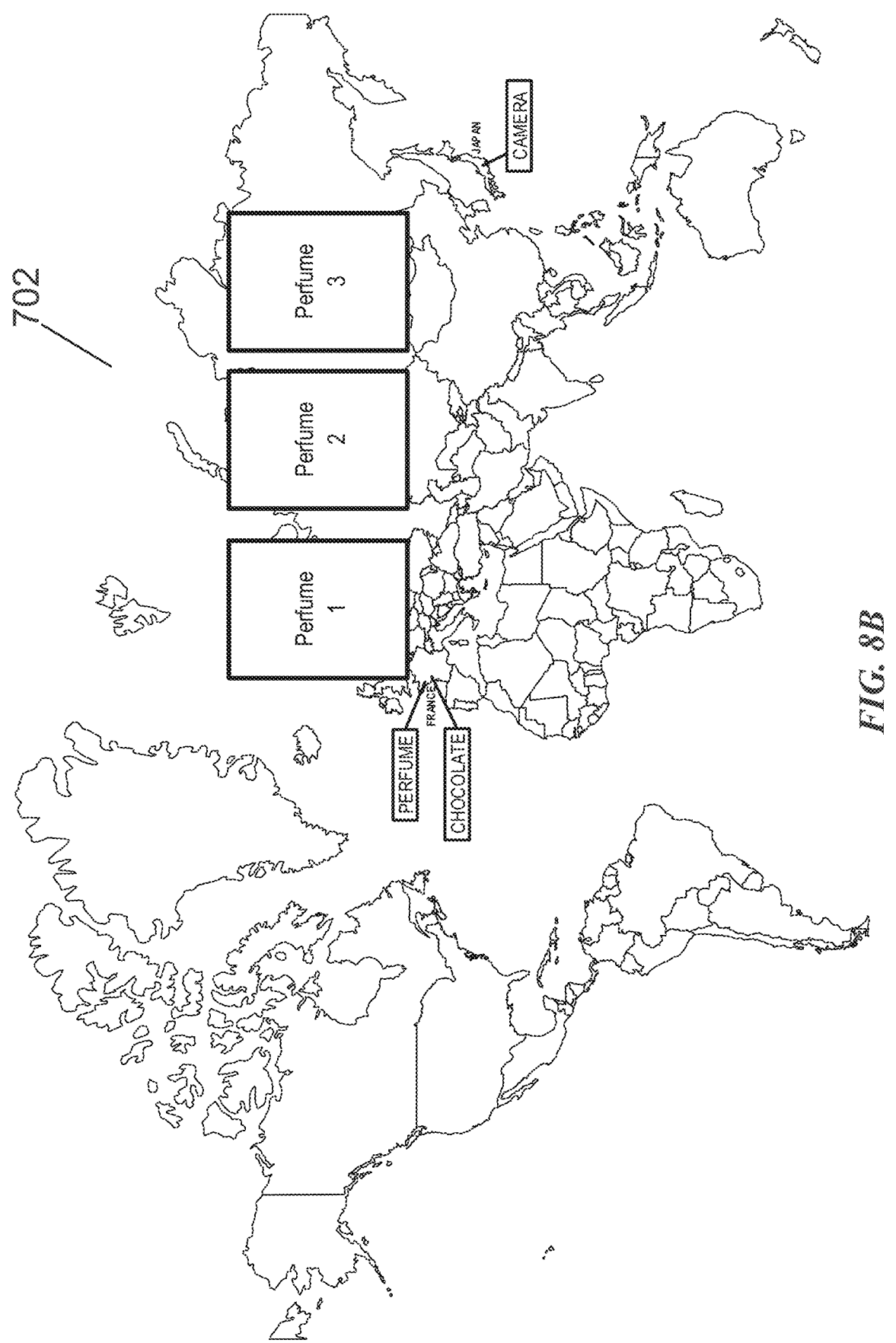

FIGS. 8A and 8B show examples of screens illustrating a market entertainment option by utilizing an interactive mapping based on some implementations of the disclosed technology. The interactive mapping is combined with the duty-free shopping on the airplane. For example, the IFE system provides the screen 700 as shown in FIG. 8A to the seatback devices 104 or PEDs 112, which includes the map with the identifiable portions corresponding to the categories of duty-free items. The duty-free item categories as shown on the screen of FIG. 8A are related to the certain areas on the world, when the certain areas are determined based on at least one of the passenger information, travel information, or communication with the passengers. For example, the screen of FIG. 8A shows the items, 'Chocolate' and 'Perfume,' located in France and the item 'Camera' is located in Japan. In some implementations, the areas, for example, France and Japan in FIG. 8A, can be determined based on the travel information and correspond to one of an origin city, a destination city, or any city between the origin city and the destination city. In some implementations, the areas, for example, France and Japan in FIG. 8B, can be determined based on the personal information of the passengers which includes country of birth, interested city, past travel location, etc. In some implementations, the areas, for example, France and Japan in FIG. 8A, can be determined based on the communication with the passengers. In this case, the passenger can directly enter the desired areas for the duty-free shopping.

On the example map as shown in the screen 700, the categories of the duty-free items, e.g., 'Perfume,' 'Chocolate,' and 'Camera,' corresponding to the areas, e.g., 'France' and 'Japan' are determined based on the relevancy between the duty-free items and the corresponding areas. Such relevancy can be determined based on various factors including origins of the items, manufactures of the items, etc. The information on duty-free items is stored in the database of the IFE system with meta data including location-related information including the origin of the items, manufactures of the items, etc., and the IFE system can utilize the metadata of the duty-free items to provide the categories of the duty-free items corresponding to the areas.

FIG. 8B shows the screen 702 provided to the seatback devices 104 or PEDs 112 when the passenger clicks 'Perfume' on the map provided in the screen 700. The screen 702 shows available perfume items, e.g., 'Perfume 1,' 'Perfume 2,' and 'Perfume 3,' in response to the click on the 'Perfume.' The duty-free shopping can proceed based on the operations between the IFE system and the seatback devices 104 or PEDs 112 by utilizing the interactive mapping, which can allow the user to enjoy the duty-free shopping in a new and more efficient manner.

Figure 9:
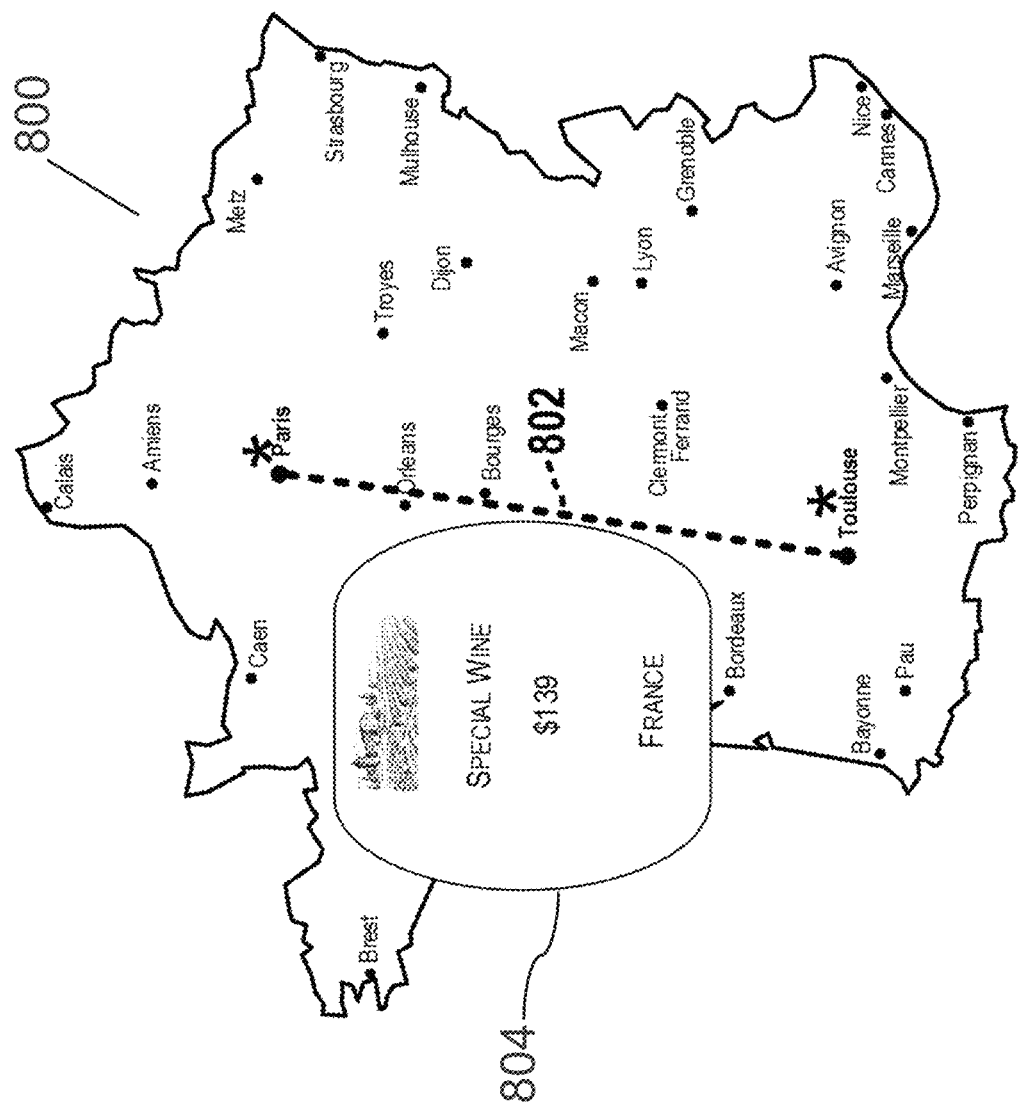
FIG. 9 shows another example of a screen illustrating a market entertainment option by utilizing an interactive mapping based on some implementations of the disclosed technology.

FIG. 9 shows another example of a screen illustrating a market entertainment option by utilizing an interactive mapping based on some implementations of the disclosed technology. The example screen 800 is configured to provide the map with the flight path 802 and special duty-free item 804 available at that time. The special duty-free item can be determined based on factors including the flight path, the flight timing, the demand for the item, etc.

Figure 10:
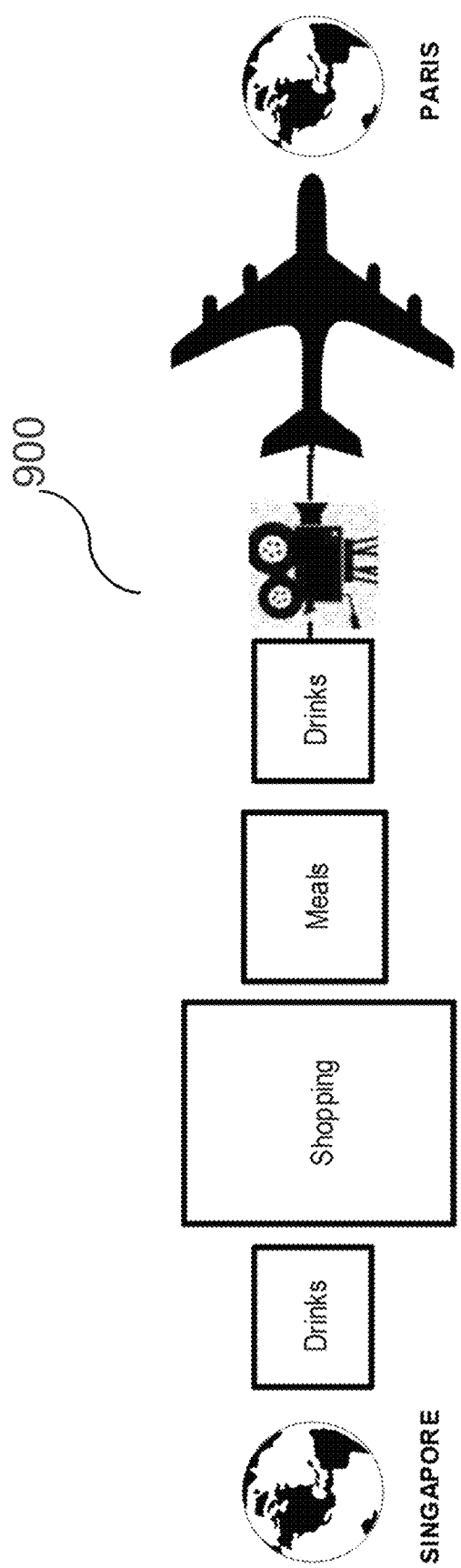
FIG. 10 shows an example of a screen illustrating a flight journey option by utilizing an interactive mapping based on some implementations of the disclosed technology.

FIG. 10 shows an example of a screen illustrating a flight journey option by utilizing an interactive mapping based on some implementations of the disclosed technology. The interactive mapping feature is provided to indicate the departure information, i.e., Singapore, and the destination information, i.e., Paris. Although FIG. 10 shows the two separate globes for the departure and the destination, the departure and the destination can be shown on one globe as shown in FIG. 4. In some implementations, the departure and the destination can be shown on the rectangular map instead of the globe map. The screen 900 in FIG. 10 shows inflight activities of the passenger after the departure and before the arrival, which includes 'Drinks,' 'Shopping,' 'Meals,' and 'Drinks.' To configure the timeline of the inflight activities of the passenger, the IFE system can record the activities of passengers, e.g., shopping, dining, entertaining, etc., in the database whenever the IFE system provides the corresponding services. In some implementations, the software stored in the IFE system allows to automatically store the activities of the passengers. In some implementations, the flight attendant can enter the occurrence of the activities after the corresponding services were made.

The flight journey option can be designed to include more interactive mapping feature. For example, the dining activity is shown on an area on the map, the area over which the airplane was flying around the meal serving time. In the similarly manner, the shopping activity is shown on an area on the map, the area over which the airplane was flying around the time when the purchase was made. In some implementations, the shopping activity is shown on an area related to the items that the passenger bought. The entertaining activity can be shown on an area on the map, the area related to contents of the entertainment activity that the passenger chose. The passengers can easily obtain information that is associated with different activities, e.g., meals, shopping, entertaining, etc., by only looking at the map. In some implementations, to provide the flight journey option, the IFE system stores the requests received form the seatback devices 104 and PEDs 112 and when receiving the request on the flight journey option, the IFE system displays the activities of a passenger during the flight with the travel information of the passenger.

Figure 11:
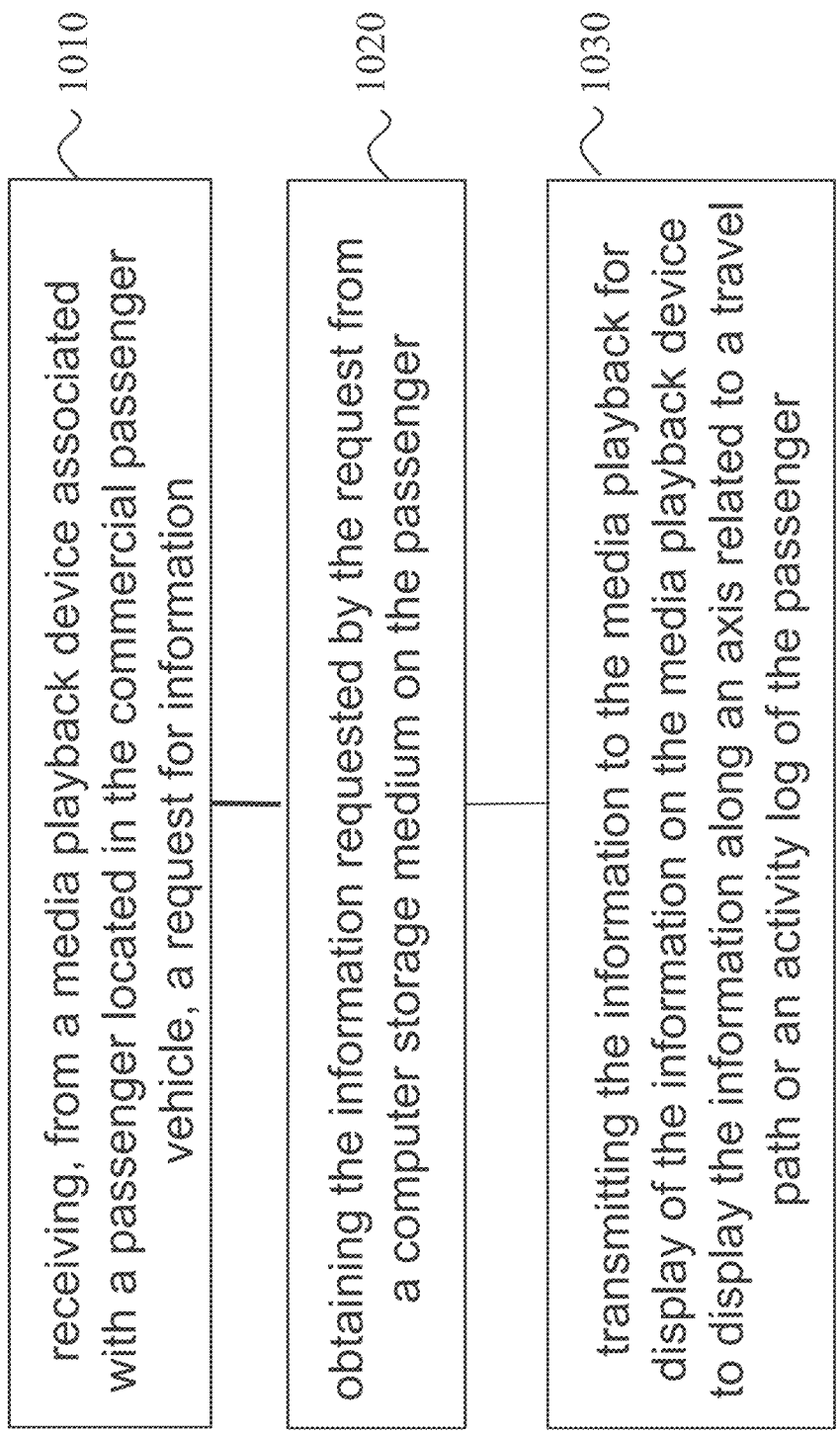
FIG. 11 shows an example flowchart of a method of providing entertainment utilizing an interactive mapping for passengers in commercial passenger vehicle based on some implementations of the disclosed technology.

FIG. 11 shows an example flowchart of a method of providing entertainment utilizing an interactive mapping for passengers in commercial passenger vehicle based on some implementations of the disclosed technology. The method is implemented by a server on a commercial passenger vehicle. At 1010, the server receives, from a media playback device associated with a passenger located in the commercial passenger vehicle, a request for information. At 1020, the server obtains the information requested by the request from a computer storage medium on the passenger. At 1030, the server transmits the information to the media playback for display of the information on the media playback device to display the information along an axis related to a travel path or an activity log of the passenger. In some implementations, the information requested is displayed on the media playback device as shown in the language selection part 310 of FIG. 4 and FIG. 10. In some implementations, the activity log of the passenger is obtained based on previous requests from the media playback device, the previous requests including at least one of a purchase of items, an entertainment selection, or a meal service. In some implementations, the transmitting of the information includes transmitting the information to display the information along a time line. In some implementations, the travel path provides information on departure and arrival locations that are to be displayed on a regular map or globe map. In some implementations, the request for information includes a language selection option configured to include images representing countries, each image being mapped to a corresponding language. In some implementations, the media playback device is a mobile device that belongs to the at least one passenger or the media playback device is located behind a headrest of a seat in the commercial passenger vehicle.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for providing an entertainment to passengers on a commercial passenger vehicle, the system comprising:
 a computer storage medium configured to store personal information and travel information of passengers; and
 a server in communication with the computer storage medium and located in the commercial passenger vehicle,
 wherein the server is configured to:
  receive, from a media playback device associated with a passenger, a request on an entertainment option provided to assist a duty free shopping on the commercial passenger vehicle;
  determine, in response to the request, duty free item categories corresponding to the entertainment option based on the personal information and the travel information of the passengers, each of the duty free item categories indicating a category of one or more duty free items that are associated with metadata including location-related information of the one or more duty free items;
  determine interactive mapping data that displays the duty free item categories on corresponding areas on a map based on location information of the duty free item categories, the corresponding areas determined based on the metadata of the one or more duty free items;
  send, to the media playback device, the duty free item categories to be displayed on the media playback device using the interactive mapping data, the duty free item categories displayed on corresponding areas on the map that are indicated as identifiable portions; and receive, from the media playback device, a click event on a portion among the identifiable portions to allow the passenger to proceed the duty free shopping of the one or more duty free items of a duty free item category corresponding to a clicked portion on the map based on the metadata of the one or more duty free items.

2. The system of claim 1, wherein the computer storage medium is configured to further store a software including at least one of location information related to a movie, location information provided during the movie, flight information, or duty-free products and wherein the flight route contents or movie contents or duty free item categories are stored in the computer storage medium with the metadata indicating the location information associated therewith.

3. The system of claim 1, wherein the corresponding areas are related to the personal information, the travel information, or a current location of the commercial passenger vehicle.

4. The system of claim 1, wherein the media playback device is a mobile device that belongs to the at least one passenger.

5. The system of claim 1, wherein the media playback device is located behind a headrest of a seat in the commercial passenger vehicle.

6. The system of claim 1, wherein the server is further configured to obtain a playlist that the passenger has previously selected.

7. A system for providing an entertainment to passengers on a commercial passenger vehicle, the system comprising:
a computer storage medium configured to store personal information and travel information of passengers; and
a server in communication with the computer storage medium and located in the commercial passenger vehicle,
wherein the server is configured to:
display, on the media playback device, a map with clickable portions on areas that are related to the personal information and the travel information of the passenger, the clickable portions associated with duty free item categories indicating a category of one or more duty free items that are associated with metadata including location-related information of the one or more duty free items;
receive, from the media playback device, a click event on a portion among the clickable portions to allow the passenger to proceed the duty free shopping of the one or more duty free items of a duty free item category corresponding to a clicked portion on the map based on the metadata of the one or more duty free items; and
display, on the media playback device, contents associated with the clicked portion.

8. The system of claim 7, wherein the computer storage medium is configured to further store a software including at least one of location information related to a movie, location information provided during the movie, flight information, or duty-free products and wherein the flight route contents or movie contents or duty free item categories are stored in the computer storage medium with the metadata indicating location information associated therewith.

9. The system of claim 7, wherein the contents include movie contents, music contents, flight route contents, information on connecting flights or gate numbers, or information on the one or more duty free items.

10. The system of claim 7, wherein the contents associated with the clicked portion is determined based on location information of the contents.

11. The system of claim 7, wherein the server is further configured to receive, from the media playback device, a request on an entertainment option, and the map is displayed in response to the request.

12. The system of claim 7, wherein the server is configured to display, on the media playback device, additional content including discount information.

13. A method implemented by a server on a commercial passenger vehicle, comprising:
receiving, from a media playback device associated with a passenger located in the commercial passenger vehicle, a request for information that includes a travel entertainment option provided to assist a duty free shopping on the commercial passenger vehicle;
determining the information requested by the request from a computer storage medium on the passenger, the information including (1) duty free item categories, each of the duty free item categories indicating a category of one or more duty free items that are associated with metadata including location-related information of the one or more duty free items and (2) interactive mapping data that displays the duty free item categories on corresponding areas on a map based on location information of the duty free item categories, the corresponding areas determined based on the metadata of the one or more duty free items, and
transmitting the information to the media playback for display of the information on the media playback device to display the information on corresponding areas on a map that are indicated as clickable portions, the information enabling to proceed the duty free shopping of the one or more duty free items of a duty free item category corresponding to a clicked portion on the map based on the metadata of the one or more duty free items.

14. The method of claim 13, wherein the request for information includes a language selection option configured to include images representing countries, each image being mapped to a corresponding language.

15. The method of claim 13, wherein the media playback device is a mobile device that belongs to the at least one passenger or the media playback device is located behind a headrest of a seat in the commercial passenger vehicle.

16. The method of claim 13, further comprising: receiving, from the media playback device, a click event on a portion among the clickable portions.

* * * * *